Nov. 5, 1929.  J. P. SHANNON  1,734,883
FISH LURE
Filed June 30, 1927

Jesse P. Shannon,
INVENTOR.

Witnesses
C. E. Churchman Jr.
Wm. P. Smith

BY Richard B. Owen
ATTORNEYS.

Patented Nov. 5, 1929

1,734,883

UNITED STATES PATENT OFFICE

JESSE P. SHANNON, OF LAKE GENEVA, WISCONSIN

FISH LURE

Application filed June 30, 1927. Serial No. 202,704.

This invention relates to a fish lure and has for its primary object a construction and arrangement of parts whereby the hook proper will be automatically held in its proper position to facilitate the engagement thereof with the mouth construction of a fish.

An object of the invention is the novel manner of constructing and arranging the spinner device so that the same may perform the dual function of attracting the attention of the fish and control the position of travel of the hook proper.

Another object of the invention is the construction in a unitary article of a spinner, hook, and fly device so arranged and cooperating as to provide a lure having many advantages over the lures heretofore manufactured and extensively merchandised.

A feature of the invention is the connecting of the spinner device so as to have unrestricted swinging movement to opposite sides of the fly and hook, so as to prevent any interference whatsoever in the engagement of the mouth of the fish with the hook or interference with the landing of the fish.

Besides the above, my invention is distinguished in the use of a spinner device that will not only attract fish and properly position the hook proper, but will additionally function to facilitate the travel of the lure through weeds.

Another feature of the invention is the novel manner of off-setting the end portion of the hook so that the spinner device is free to function in a horizontal position in a plane above the hook and fly so as to hold the fly and hook in its proper horizontal position during the travel thereof through the water.

Figure 1:
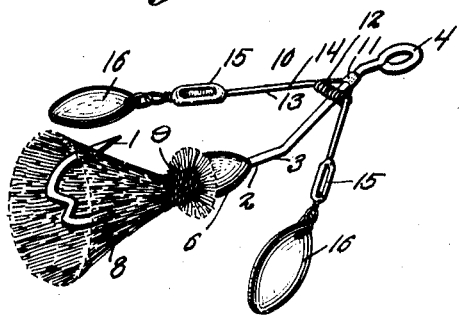
Figure 2:
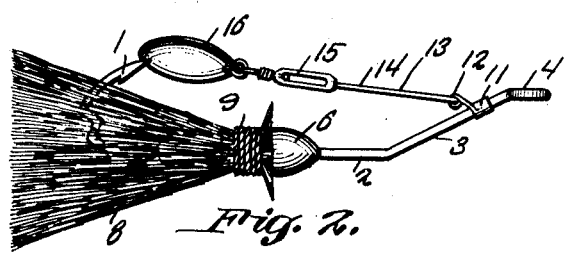
Figure 4:
Figure 6:
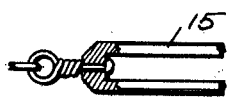
Figure 3:
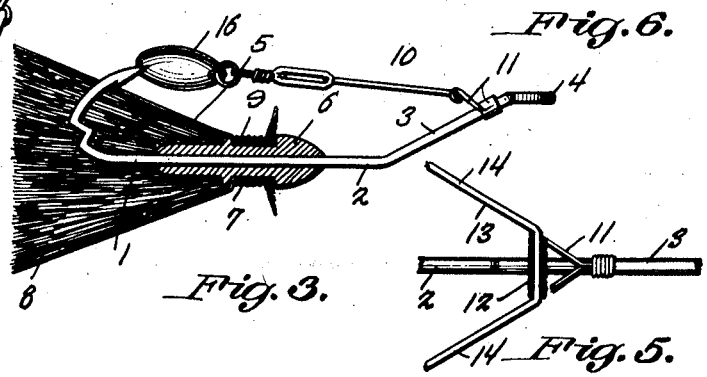
Figure 5:
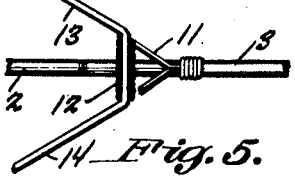

With these and other objects in view, the invention will be better understood from the following detailed description taken in connection with the accompanying drawing wherein:

Figure 1 is a perspective view of the lure,
Figure 2 is a side elevation,
Figure 3 is a longitudinal sectional view,
Figure 4 is a perspective view of the connector and its associated parts,
Figure 5 is a sectional view through the connector and associated parts, Figure 6 is a detailed sectional view of the swivel.

Again referring to the drawing illustrating one of the many constructions of my invention, the numeral 1 designates the hook proper, including a shank 2, which is formed to provide the obliquely directed portion 3 adjacent the end thereof which terminates in the eye 4, this eye being in substantially the same plane as the point of the hook 1. Fixed to an intermediate portion of the shank 2 is a fly device 5 consisting of a plug 6 secured to the shank and provided with an annular groove 7 for receiving the fly element 8, secured in position by the cord 9.

A vital part of my present invention resides in the provision of a device so constructed and arranged with relation to the hook and fly device that the fly device and hook will be automatically held in proper horizontal position during the travel of the lure through the water. In the construction illustrated the spinner device 10 is so constructed and positioned that the action of the water thereon will create a pull in the proper direction to elevate the hook and fly to its proper horizontal position and this is brought about by connecting the spinner device to the off-set end portion 3 at a point adjacent to but in a lower plane than the eye 4 when the lure is in the proper position in the water so that the spinners may assume a position in substantially the same plane as the hook. The spinner device comprises a connector 11 fixed to the off-set portion 3 preferably adjacent the eye 4 carrying a sleeve 12 arranged transversely of the shank body in which is swingingly mounted the straight apical portion of a V-shaped yoke 13, the limbs 14 of which being arranged in a diverging relation so as to properly dispose the swivels 15 on opposite sides of the hook and fly device, so that when the spinners or other water actuated elements, 16 are connected to the swivels they may properly function on opposite sides of the fly device and hook at the proper elevation relative thereto to control the position of the fly device and hook.

I wish to call particular attention to the fact that the connection between the spinner device and the hook shank is such that the spinner device is free to swing in an unrestricted manner to opposite sides of the hook and fly device without interfering with the proper engagement of the hook by the fish and to facilitate casting and the travel of the lure through weeds. The novel form of connection between the spinner device and the hook allows the former to freely swing to various positions and more particularly to the horizontal position above the fly device and hook in the travel of the lure through the water.

It will be noted that the fly device, hook and spinner device are so designed and interconnected that a very substantial type of lure is provided of a very neat compact arrangement with the various parts connected for relative movement to facilitate the engagement of the hook with the fish and to facilitate the travel of the lure through weeds.

It is, of course, to be understood that various other constructions of hook and fly devices may be utilized with my improved construction of spinner device and various other forms of spinner devices may be used with the form of hook and fly device illustrated, and besides the component parts may be constructed and interconnected in various other manners than illustrated and, therefore, I do not desire to be limited in protection in any manner whatsoever except as set forth in the following claims.

What I claim as new is:

1. A fish lure comprising a hook, including a shank having its free end extending at an angle and terminating in an eye, a connector secured to the angular end portion of the shank, a yoke swingingly connected to said connector and water actuated element secured to the end of the yoke and arranged in a predetermined relation to said hook.

2. A fish lure comprising a hook, including a shank having its free end extending at an angle and terminating in an eye, a connector secured to the angular end portion of the shank, a yoke swingingly connected to said connector and water actuated elements secured to the ends of the yoke and arranged in a predetermined relation to said hook and a fly device directly secured to said shank and arranged in a predetermined position relative to the hook and to said elements.

3. A fish lure comprising a hook including a shank terminating in an off-set portion, a connector secured to the off-set portion, a yoke pivotally connected to said connector to swing to opposite sides of said shank, spinners connected to the ends of said yoke in a predetermined position relative to said hook, a plug secured to said shank, and a fly device secured to said plug to partly conceal said hook and to be arranged in a predetermined relation with said spinners.

4. A fish lure, comprising a hook including a shank and having an eye formed at the free end of the shank, a portion of said shank being obliquely angled to position the eye in substantially the same plane as the hook point, a fixed sleeve mounted upon and transversely of said oblique portion adjacent said eye, a substantially V-shaped yoke having the apical portion formed to extend loosely through said sleeve, and a spinner element mounted upon the end of each arm of the yoke.

5. A fish lure comprising a hook having a shank, guard arms, means connecting the guard arms at their front ends to the shank for swinging movement beyond the upper and lower sides of the shank, and elements connected to the rear ends of the guard arms and adapted to normally maintain the guard arms above the upper side of the shank when the lure is in the water.

6. A fish lure comprising a hook having a shank, guard arms, means connecting the guard arms at their front ends to the shank for swinging movement beyond the upper and lower sides of the shank, and spinners swivelly connected to the rear end of the guard arms and adapted to normally maintain the guard arms above the upper side of the shank when the lure is in the water.

7. A fish lure comprising a hook including a shank having its free end terminating in an eye, a connector secured to the shank, a yoke rockably connected to said connector, and water actuated elements secured to the ends of the yoke and arranged in a predetermined relation to said hook.

In testimony whereof I affix my signature.

JESSE P. SHANNON.